No. 797,058. PATENTED AUG. 15, 1905.
P. J. HEDLUND.
CENTRIFUGAL PUMP LINING.
APPLICATION FILED JAN. 12, 1905.

*Fig. 3.*  *Fig. 2.*  *Fig. 4.*

WITNESSES:
Gustave Dieterich
Edwin H. Dietrich

INVENTOR
Per Johan Hedlund
BY Park Benjamin
his ATTORNEY

UNITED STATES PATENT OFFICE.

PER JOHAN HEDLUND, OF STOCKHOLM, SWEDEN.

CENTRIFUGAL-PUMP LINING.

No. 797,058.　　　　Specification of Letters Patent.　　　　Patented Aug. 15, 1905.

Application filed January 12, 1905. Serial No. 240,727.

*To all whom it may concern:*

Be it known that I, PER JOHAN HEDLUND, of Stockholm, Sweden, have invented a new and useful Improvement in Centrifugal-Pump Linings, of which the following is a specification.

The invention relates to centrifugal pumps; and it consists in a detachable lining interposed between the pump-casing and the wheel and also in the combination, with a rotary pump-wheel and a casing therefor constructed to inclose the circumferential periphery of said wheel, of a detachable internal lining having a flange interposed between said casing and said wheel periphery.

The object of the invention is to provide wearing-rings between pump and casing and also to protect the interior of the casing from abrasion due to solids in the liquid pumped.

Figure 1:
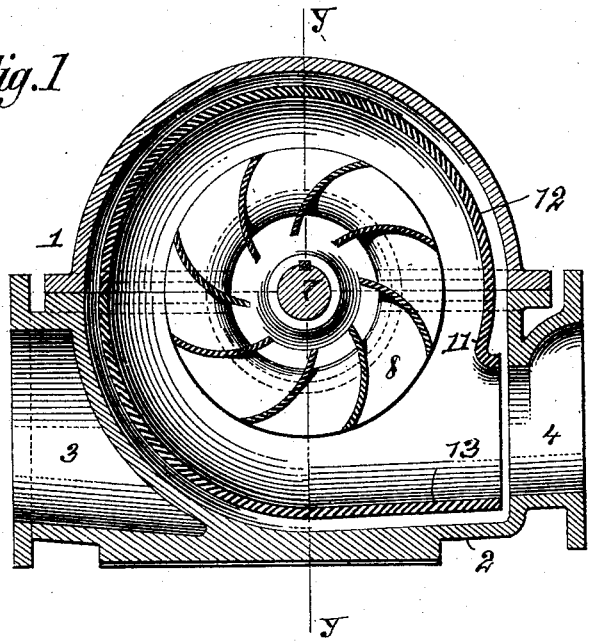
Figure 1:
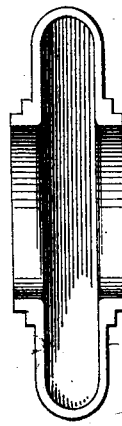
Figure 1:
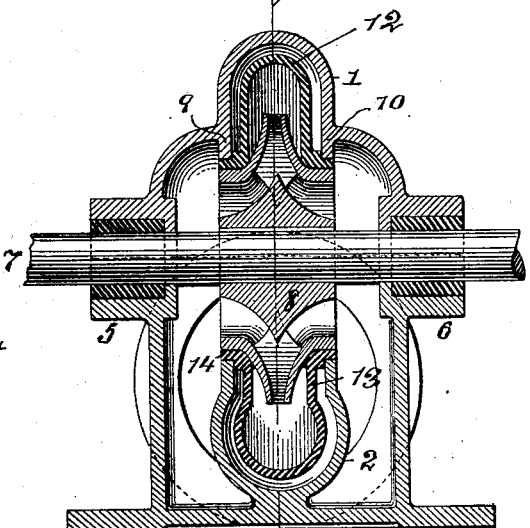
Figure 1:
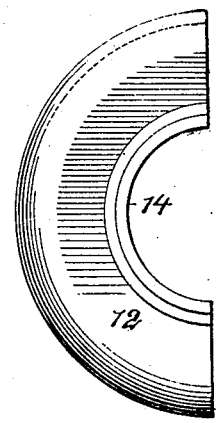

In the accompanying drawings, Figure 1 is a section of a centrifugal pump on the line $xx$ of Fig. 2, showing my lining in place. Fig. 2 is a section on the line $yy$ of Fig. 1. Fig. 3 is an edge view, and Fig. 4 is a side view, of the upper half of my lining.

Similar numbers of reference indicate like parts.

The pump-casing is divided internally into two sections 1 and 2, which are secured together by any suitable means. The inlet 3 and the outlet 4 are formed in the lower section 2. The bearings 5 and 6 for the wheel-shaft 7 are in both sections. The pump-wheel 8, of usual construction, is keyed on the shaft 7. Ordinarily within the casing-sections there are formed semicircular flanges 9 and 10, which inclose the pump-wheel and make a joint with the periphery thereof. Between the meeting faces of said flanges and of the wheel periphery there is apt to be much wear, especially if the liquid pumped contains grit or dirt, and this soon results in undesirable leakage. In addition the solid materials in the liquid scour and abrade the interior of the casing, so that the latter soon becomes thin and wears out. In order to obviate these difficulties, I provide an interior lining or casing 11, formed in two parts 12 and 13. Each part of said lining conforms to the general shape of the part of the casing in which it is received and forms a complete protection for the internal surface of said casing against the abrasion or wear due to solids in suspension in the liquid pumped. On each part of said lining are shouldered flanges 14, which enter between the casing-flanges 9 and 10 and the pump-wheel periphery, and so serve as wearing-rings to take up the frictional wear due to rotation of the pump-wheel. It will be observed that by this construction practically all the wear comes upon the lining 11, which may be cheaply made as a casting and easily applied and removed.

I claim—

1. In combination with a rotary pump-wheel and a casing therefor, inclosing the circumferential periphery of said wheel, a lining for said casing having flanges interposed between said casing and said wheel periphery.

2. In combination with a rotary pump-wheel and a casing therefor divided into an upper and a lower section and inclosing the circumferential periphery of said wheel, a lining for said casing formed in sections, respectively received in said casing-sections, and provided with flanges interposed between said casing and said wheel periphery.

In testimony whereof I have signed my name to this specification in the presence of two subscribing witnesses.

PER JOHAN HEDLUND.

Witnesses:
　WALDEMAR BOMAN,
　ERIK FOSSBERG.